United States Patent [19]

Baker

[11] 4,023,756
[45] May 17, 1977

[54] THERMOPNEUMATIC SUPPORT DEVICE

[76] Inventor: Thomas W. Baker, 25 Stewart Place, Mount Kisco, N.Y. 10549

[22] Filed: Oct. 14, 1975

[21] Appl. No.: 621,791

[52] U.S. Cl. .................................. 248/59; 138/107; 248/54 CS; 248/327; 248/DIG. 1

[51] Int. Cl.[2] .......................................... F16L 3/20

[58] Field of Search ......... 248/58, 59, 54 R, 54 CS, 248/DIG. 1, 323, 327; 60/516; 73/16, 73, 60, 92; 138/107, 31; 137/457, 357

[56] References Cited

UNITED STATES PATENTS

| | | | |
|---|---|---|---|
| 2,156,468 | 5/1939 | Wood | 248/54 CS |
| 2,210,188 | 8/1940 | Smith | 60/516 |
| 2,225,515 | 12/1940 | Wood | 248/54 CS |
| 2,237,248 | 4/1941 | Denison | 60/516 X |
| 2,248,730 | 7/1941 | Wood | 248/54 CS |
| 2,540,525 | 2/1951 | Howarth et al. | 248/54 R X |
| 2,949,270 | 8/1960 | Wood | 248/54 CS |
| 2,975,996 | 3/1961 | Sherburne et al. | 248/54 CS |
| 3,116,045 | 12/1963 | Sherburne | 248/59 X |

FOREIGN PATENTS OR APPLICATIONS

| | | |
|---|---|---|
| 530,872 | 12/1940 | United Kingdom |
| 924,857 | 5/1963 | United Kingdom .................. 248/59 |

*Primary Examiner*—Roy D. Frazier
*Assistant Examiner*—Rodney H. Bonck
*Attorney, Agent, or Firm*—Barry G. Magidoff

[57] ABSTRACT

A thermopneumatic support device for providing support over a range of positions for objects, such as high temperature steam piping, subject to temperature changes and thus to changes in position resulting from thermal expansion or contraction. The device utilizes the heat energy of the object being supported in order to provide the necessary power to move the object over a range of positions. The heat energy from the object being supported provides the power for moving the thermopneumatic support in direct proportion to the expansion or contraction resulting from the variation in temperature of the object being supported. The device comprises pneumatic actuating means comprising a sealed chamber containing a fixed mass of a compressible fluid which is in thermal contact with the object being supported. Pressure changes in the enclosed compressible fluid results in direct proportion to pressure changes of the fluid which in turn causes movement of the support means in response to temperature changes in the object being supported. There are coupling and linking means provided between the support means and the pipe and the support means and a stationary support respectively.

15 Claims, 6 Drawing Figures

FIG. 6 ns and hysteresis inherent in the operation of springs. Examples of such spring-loaded pipe supports are shown in U.S. Pat. No. 2,929,397. Also see the motor-actuated pipe support of U.S. Pat. No. 2,918,238.

THERMOPNEUMATIC SUPPORT DEVICE

This invention is directed to means for properly and effectively suporting, positioning and/or controlling movement of equipment, such as piping or other high temperature steam equipment, that is subject to changes in position, or movement, due to changes in temperature of all or part of the object being supported. The present invention can provide a multiplicity of functions, including that of a shock and sway arrester, a springless constant support, and assist to known, e.g. spring, supports to render them more truly constant, in addition to acting as a positioner for piping. In all cases the device of the present invention provides a capacity for absorbing shock and vibration, thus further protecting the object being supported.

A variety of different types of pipe supporters and positioners have been utilized by the prior art. For example, spring-loaded pipe positioners and hydraulically-operated pipe positioners have been utilized. The spring-loaded supports are often referred to as "constant spring supports" in that they are intended to provide a constant force to support a variety of positions. Such supports are not however truly constant because of the unavoidable friction developed between relatively moving parts and the hysteresis inherent in the operation of springs. Examples of such spring-loaded pipe supports are shown in U.S. Pat. No. 2,929,397. Also see the motor-actuated pipe support of U.S. Pat. No. 2,918,238.

A constant supporting force-type of positioner, utilizing a hydraulic unit, is described in U.S. Pat. No. 2,225,515. Such hydraulically operated support means requires a hydraulic fluid pressure motor, for example operated by electricity, for controlling the pressure within the cylinder. A variety of other spring-loaded and hydraulically-actuated support units, including some which are activated by thermostatic devices attached to the pipe to be supported, are commercially available and described, for example, in a catalogue published by the ITT Grinnell Corporation, entitled "Pipe Hangers, " catalogue PH-74.

Mechanically actuated pipe positioners which are activated by the change in temperature of the pipe to be supported, are described in a series of U.S. Pat. Nos. 3,539,136, 3,637,176 and 3,695,564. The devices described in the preceding three patents all include mechanical linkages between the supported pipe and a rigid support. The linkages are activated by the thermomechanical changes in pipe length due to contraction or expansion of the pipe material with increase or decrease in temperature.

In each case the positioning of the pipe, as the pipe expands or contracts with change in temperature, is activated, directly or indirectly, by the actual thermomechanical changes in pipe length. In the direct activation of the first two patents, the stress of moving the pipe is on the pipe itself. That is, the force which is exerted on the mechanical linkages to position the pipe with change in length is directly obtained from the thermomechanical changes in the pipe. The indirect linkage utilizes an electric motor which is activated, i.e. switched on or off, by these thermomechanical changes in length.

The present invention provides means for thermopneumatically positioning and supporting objects which are susceptible to changes in temperature, and thus to thermomechanical changes in position, wherein the positioning and supporting of the object is directly controlled by the changes in temperature in the object being supported but which utilizes an energy source which is substantially free and which places substantially no strain on the object being supported. The power for activating the thermopneumatic support and positioner in accordance with the present invention is derived by absorbing a negligible proportion of the heat energy from the object being supported. Thus the present invention provides a highly efficient and effective support and positioner means for objects which are subject to variations in temperature.

In accordance with this invention, means are provided for supporting objects, such as piping or other high temperature equipment utilized for example with high temperature steam, that are subject to temperature changes and thus to changes in position resulting from thermal expansion or contraction. The device comprises a variable-volume thermopneumatic actuating means adapted to be in thermally conductive contact with the object being supported and to vary in volume in direct response to variations in temperature of the object the actuating means having first and second exterior portions movable relative to each other with variatin in the volume of the actuating means; first coupling means operably connected to the first external portion of the actuating means and adapted to be supportingly connected to the object being supported; and second coupling means operably connected to the second external portion of the actuating means and adapted to be supportingly connected to a stationary support.

The actuating means is a substantially gas-tight, sealed system containing a constant mass of the compressible fluid, or gas. The actuating means is preferably filled with an inert compressible fluid such as air, nitrogen or any of the so-called Noble gases including helium or argon.

In operation, the temperature of at least a portion of the actuating means, specifically the temperature of the compressible fluid, or gas, within that portion, varies directy with the temperature of the object being supported. As the object increases in temperature, for example, the temperature of the gas increases, and thus the pressure of the gas in the actuating means tends to increase, in turn increasing the volume of the actuating means by causing the movable portions to move apart, which in turn moves the object being supported in the desired direction via the first coupling means.

The present invention thus provides a device for supporting thermally variable objects over a range of position changes caused by such thermal variations which does not require any external power source nor place any stress upon any portion of the object being supported. The support device can be placed in a convenient location, distant from the point of temperature change if desired, without requiring any lengthy, easily damaged mechanical linkages. The device of the present invention is further simple and compact in design, sturdy and durable in construction, and can perform its various functions dependably and without requiring external adjustment of a continuing nature during use.

The advantages and objects of the present invention will be more readily understood by those skilled in the art from the following detailed description of preferred embodiments of the invention, as shown in the accompanying drawings, which describe and illustrate several embodiments of the invention. The embodiments hereunder described and herewith illustrated are merely exemplary of the scope of this invention and are not intended to be exclusive thereof. In the drawings, wherein reference numerals denote corresponding parts throughput the several views of each embodiment:

FIG. 5 is a front elevation view of a second embodiment of the invention for supporting a downwardly moving object; and FIIG. 6 is a side elevation view taken in the direction of lines 6—6 of FIG. 5.

Figures 1, 4:
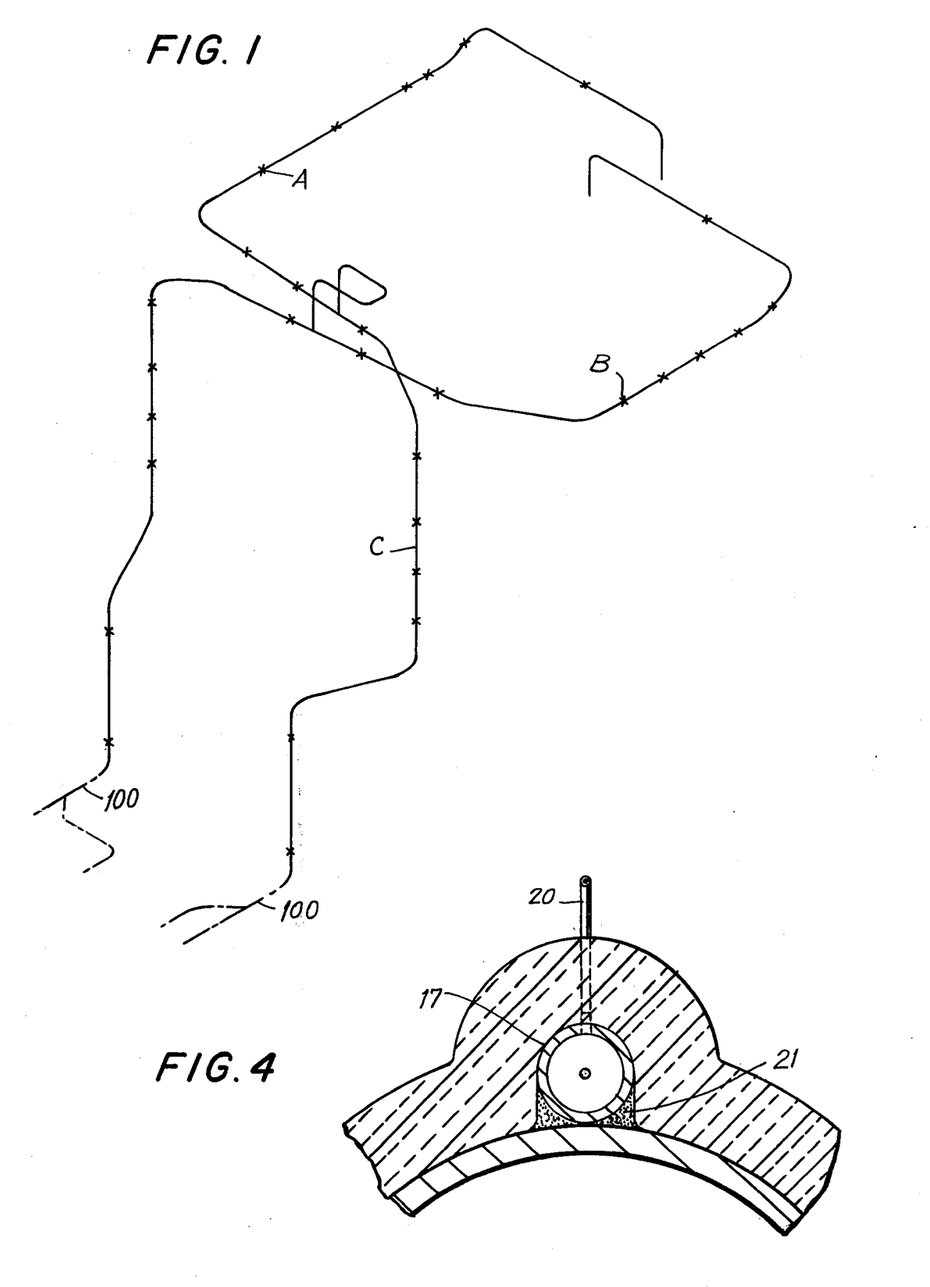
FIG. 1 is an isometric diagrammatic sketch of a high temperature steam (hot reheat) pipeline utilizing the device of the present invention.
FIG. 4 is a cross-sectional view taken along lines 4—4 of FIG. 2.
Figures 2, 3:
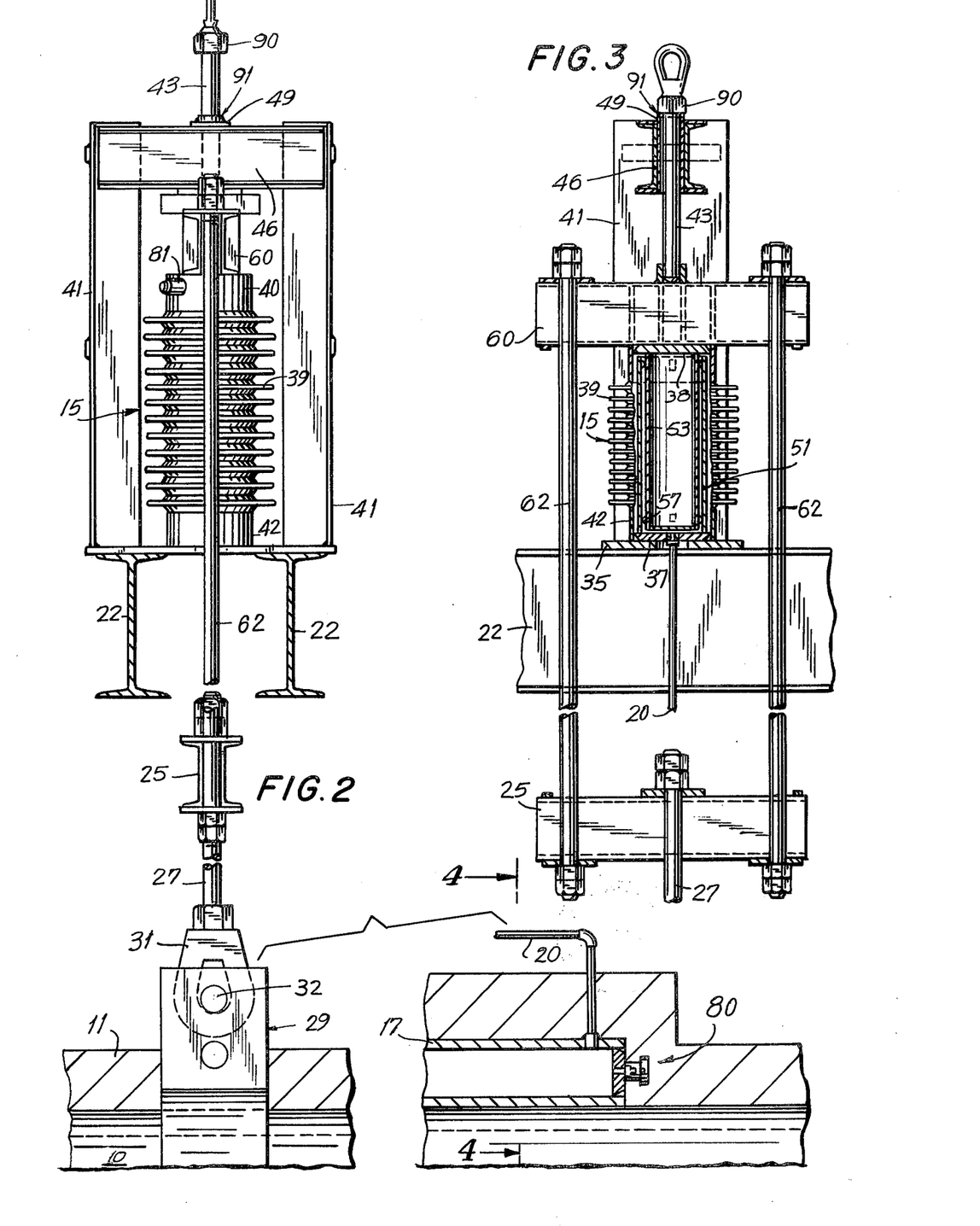
FIG. 2 is a side elevational view showing a device of this invention in operating position and associated with the piping of FIG. 1, certain parts being shown in cross-section for better illustration shown in the operating or "hot" position.
FIG. 3 is a partially broken away side elevation view of FIG. 2; but illustrating the "cold" position.

Referring first to FIGS. 2, 3, and 4, these drawings illustrate an embodiment of the present invention shown to be operatively connected to a section of piping 10 encased in a suitable heat insulating sheath 11. For the purposes of this disclosure, it is assumed that the piping section 10 is part of a piping systen employed at a high temperature steam power plant, for example a portion of the piping system depicted in FIG. 1. Modern, steam-generated power plants utilize such piping systems to transmit high pressure steam at temperatures, e.g. of approximately 1000° F. and at pressures up to approximately 3900 lbs. per square inch. Satisfactory, problem-free, long term operation of such piping systems require adequate support to allow and compensate for movement and change of position of the piping due to normal expansion and contraction of the metal thereof during variations in the operation of the steam generating system.

The thermopneumatic support device of the present invention, shown as utilized for the support and control of the pipe 10, comprises a variable-volume actuating chamber, generally designated by the numeral 15, which is part of an actuating means system including in addition the gas reservoir 17 and pressure-conducting fluid conduit 20. The gas reservoir 17 is shown in FIGS. 2 and 4 to comprise a substantially tubular member extending substantially parallel to and in contact with the external surface of the pipe 10 being supported. Although the greatest efficiency would be obtained by utilizing an annular reservoir completely surrounding the pipe 10 to be supported, it has been found to be adequate to utilize the cylindrical reservoir 17 shown in the drawings together with a high conductance filler material 21 to provide as large a surface area for heat transfer as possible; one example of such material is a high heat conductance mastic material 21. Such high heat-conductance mastic materials are well known in the art and do not per se constitute a part of this invention. One such material is sold under the trademark Thermocon, and can usefully be applied along the entire length of reservoir 17. The mastic thus fills in the gap that would otherwise limit the amount of heat conductance. The reservoir is in turn covered by the insulating sheath 11 to prevent any undue escape of heat therefrom.

The variable volume actuating chamber 15 comprises a flexible, corrugated, metal bellows unit 39 having rigid upper and lower collars 40, 42 respectively which are closed off at their outer ends by a lower end cap 37 and upper end cap 38. Rigidly secured to the upper end cap 38 are upper paired short channels 60. The lower end cap 37 rests upon and can be secured to the base plate 35. Rigidly secured to and extending downwardly from the ends of the channels 60 are rods 62 which at their lower ends are in turn rigidly secured to a lower paired short channels 25. A support rod 27 extends downwardly from and is supported by the lower channels 25 and ends in an eye-nut 31. The lower and upper channels 25, 60, the rods 62 and support rod 27 form a "trapeze-type" coupling between the actuating chamber and the pipe 10, which is connected to the eye-nut 32 via clamp 29.

A pair of structural supports 41 are rigidly secured at their lower ends to the base plate 35. Paired support channels 46 are rigidly secured to the upper ends of the structural supports 41. Centered above the upper end cap 38 and rigidly secured to the support channels 46 is an annular plate 49. A guide rod 43 is rigidly, threadedly secured to, and extends upwardly from, the upper channels 60, slidably passing through the hole in annular plate 49 and between the support channels 46. The upper end of the guide rod 43 threadedly connects to a nut 90. The lower surface of nut 90 acts as a lower limit stop when contacting retainer washer 91.

Secured to and extending upwardly from the lower end cap 37, and substantially centered thereon, is a lower tubular internal guide member 51. Secured to and extending downwardly from the upper end cap 38 and centered substantially within the end cap 38 and within the lower guide tube 51 is an upper guide tube and back-up support and positioning member 53. The telescoping guide tubes 51 and 53 aid in maintaining the vertical alignment of the metal bellows 39, especially when in the compressed, i.e. cold, position.

The interior of the variable volume actuating chamber 15 is connected to the gas reservoir 17 via conduit 20 which passes between stationary supports 22 and through a hole in base plate 35 where it is coupled onto the end cap 37. The interior of the actuating means, including the actuating chamber 15, the conduit 20 and the reservoir 17, can be pressurized through a quick-disconnect fitting within the nipple 81 on the upper collar 40.

To provide the necessary guidance for the variable volume actuating means 15, without requiring unduly close tolerances between the upper guide tube 53 and the lower guide tube 51, guide lugs 57 are provided around the internal surface at the upper end of lower guide tube 51 and around the outer surface of the lower end of upper guide tube 53.

In order to clearly describe the operation of the above-described embodiment of the present invention, it is assumed that the apparatus has been installed in a manner in accordance with the illustration in the drawings, and that the parts are in the relative positions shown by FIG. 3 in the cold or contracted position, and by FIG. 2 in the hot or extended position. Such a complete system is exemplified by the diagram of FIG. 1, where the upper, horizontal lengths of pipe are supported at points A and B in accordance with the apparatus illustrated in FIGS. 2, 3 and 4. When installed the entire system is initially in the so-called cold condition, wherein the temperature of the entire system is assumed to be substantially that of the ambient, eg. 70° F. The piping system shown in FIG. 1 is an example of a high temperature reheat steam line of, for example, a steam-driven turbine.

When the system is started up, and steam initially is passed through the piping system of FIG. 1, the temperature of the entire piping system is gradually increased to a maximum predetermined level, for example, 1000° F. The expansion of the metal in the long vertical rise in the piping system of FIG. 1 caused by this temperature increase in turn causes a raising of the level of the horizontal portions of the piping systems which are supported and positioned at points A and B by the support devices of the present invention.

When the device illustrated in FIGS. 2 through 4 is initially connected to the piping system, at ambient temperature, the lower surface of the nut 90 rests upon the upper surface of retainer washer 91 and the upper surfaces of the upper paired channels 60 are substantially below the lower surfaces of the support channels 46, which limit upward travel. The lower end of upper guide tube 53 is situated close to the bottom end cap 37 in this cold position, and is preferably capable of supporting the pipe in case of failure of nut 90.

The sealed fluid system comprising the actuating chamber 15, conduit 20 and reservoir 17 is initially purged with, for example, nitrogen. The system is then charged with nitrogen, through, for example, the quick disconnect fittings 80, 81 on the end of reservoir 17 or in the top collar 40, respectively. The system is charged with nitrogen through the same fitting until the pressure is raised to the point at which the volume of the actuating chamber 15 begins to expand, i.e., the upper end cap 38 just begins to move away from the lower end cap 37 and the upper guide tube 53 is just raised above the lower end cap 37. At this point, the weight of the pipe, at the points of support A, B, is exactly balanced by the thrust exerted by the pressure within the pressurized system acting over the area of the actuating chamber 15.

Steam is then passed through the pipe 10. The temperature of the pipe 10 gradually increases causing expansion of the pipe while simultaneously heating (by heat conduction, through the walls of the pipe 10 and reservoir 17) the nirtogen within the reservoir 17. The heating of the nitrogen in the reservoir 17 causes a further increase in pressure in the support system which is communicated through conduit 20 into the interior of the actuating chamber 15.

The increase in temperature in reservoir 17 causes a flow of nitrogen from the reservoir 17 through the conduit 20 and into the actuating chamber 15. The resulting increase in mass in the actuating chamber causes an increase in pressure and thus an upward movement of the upper end cap 38 and of the paired channels 60 attached thereto, which in turn moves the pipe 10 in an upwardly direction via the trapeze coupling means 60, 62, 25 and the support rod 27. The upward movement of the end cap 38, and thus of the pipe 10, is designed to be substantially equal to the increase in height caused by thermal expansion.

Accordingly, the resultant changes in system pressure are caused by temperature changes in the reservoir 17, derived solely from corresponding temperature changes in the pipe 10. The resultant increase in pressure, within the actuating means system causes the expansion of the actuating chamber 15, thus causing movement of the reheat steam pipe in an upwardly direction as it is heated. Thus, the hot pipe system is always completely supported by this type of support and always in its proper position with regard to the temperature. The supported pipe system provides the necessary energy to move itself from the cold position to the hot position. The thermopneumatic support utilizes a minute amount of the heat which is given off by the pipe as it is heated. Similarly, as the pipe 10 cools, the pressure within the actuating chamber is caused to decrease, by a reversal of the aforesaid process, thus causing the pipe to be lowered back to the cold position as the temperature of the supported pipe drops.

The following computation is to be considered one example of a system designed to provide the necessary support over a range of positions for a heated pipe at any temperature to which it is designed to be subjected. The relative sizes of the reservoir and of the actuating chamber unit, as well as the pressure to which the device is initially subjected, are determined as follows, referring to FIGS. 1 through 4:

The "weight" of the pipe being supported, as determined by tension on the support rod 27, in this example is considered to be 21,950 pounds, for a 42-inch OD, 2-inch wall thickness pipe which is intended to be subjected to a maximum operating temperature of about 1000° F. The vertical rise of the piping system between the lower horizontal runs and the upper supported horizontal runs, at A,B, is about 200 ft. The extension in the vertical rise caused by expansion due to the temperature increase from 70 ° F to about 1000° F is approximately 17 inches. Allowing for flexure of the system as dictated by other supports, guides and anchors of the pipe support system, the upward movement at point A is 7 3/16 inches. The metallic bellows 39 is a conventionally available 12-corrugation steel expansion joint having a nominal size of 10 inches with a bellows area of about 144 square inches, and in its cold position being about 21 ⅛ inches in length. When in its extended position, after having travelled vertically a distance of 7 3/16 inches, the volume in the conduit 20 and actuating chamber 15 is 1.50 cubic feet. The system is initially pressurized with nitrogen to a pressure of about 167 psia.

The volumetric capacity of the reservoir 17, required for the above exemplified system, can be determined by the following computation, assuming the given values of the temperature change, pipe weight and pipe travel caused by thermal expansion and bellows size set forth above.

The entire system: actuating chamber 15, conduit 20 and reservoir 17, is filled with an inert gas, e.g., nitrogen to an initial pressure of 167 lbs. per square inch absolute (psia) at a temperature of 70° F or 530°Rankine (°R). The actuating chamber 15 and conduit 20 are not insulated and will remain at ambient temperature while the reservoir 17 will increase in temperature from 70° F (530°R) to 950° F or 1410° R. Because of the increase in temperature of the nitrogen in the reservoir, some of the mass of nitrogen in the reservoir will be forced into the conduit 20 and the actuating chamber 15. This outward flow of nitrogen will continue until the mass of nitrogen left in the reservoir 17 is compatible with the temperature in the reservoir (1410°0 R) and the pressure in the entire system. By the same token, the mass of nitrogen forced into the conduit 20 and actuating chamber 15, plus the mass already in the actuating chamber and conduit, will be compatible with the pressure in the entire system and the temperature in the conduit and actuating chamber (530° R).

The initial pressure of 167 lbs. per square inch absolute is arrived at by taking the required lifting effort of the support and dividing it by the effective area of the bellows: The required lifting effort is 21,950 lbs.; the bellows' effective area is 144 square inches; the quotient is 167.13 psia. The volume of the bellows, contracted, plus the conduit = 0.75 ft.$^3$. The volume of the bellows, extended, plus the conduit = 1.50 ft.$^3$. The density ($\rho'$), of the nitrogen in the entire system at installation equals the pressure in lbs. per square foot absolute, divided by 55.18 (the gas constant for nitrogen), times the temperature in degrees Rankine:

$$\rho' (167.13 = 144)/(55.18 = 530 \text{ lbs./ft.}^3$$

$$\rho' = 0.8229 \text{ lbs./ft.}^3$$

The maximum pressure in the system at operating temperature, i.e., 950° F, is arbitrarily set at 225 psia, based upon the structural strength of the conventionally available components utilized in constructing the support of this invention. The required volume of the reservoir 17 is determined by the mass of nitrogen which must flow into the conduit 20 and actuating chamber 15 in order to increase the pressure therein from 167.13 psia to 225 psia, substantially without any temperature change in the actuating chamber 15 and the conduit 20 and with the volume increasing from 0.75 ft.$^3$ to 1.50 ft.$^3$. The density of nitrogen at 530° R and 225 psia ($\rho'$) is:

$$(225 \times 144)/(55.18 \times 530 = 1.10786 \text{ lbs./ft}^3 = \rho''$$

The total mass of nitrogen in the actuating chamber 15 and conduit 20 at 225 psia (at the "operating" position) is 1.66179 lbs. of nitrogen (1.50 ft.$^3$ × 1.10786 lbs./ft$^3$).

The total mass of nitrogen in the actuating chamber 15 and conduit 20 in the cold or initial position is 0.61717 lbs. of nitrogen (0.75 ft.$^3$= 0.8229 lbs./ft.$^3$). The reservoir must therefore be capable of providing 1.0446 lbs. of nitrogen (1.66179 lbs. minus 0.61717 lbs.) into the actuating chamber 15 and conduit 20.

The reservoir will be at 1410° R and 225 psia in the hot or operation condition. The density of nitrogen at 225 psia and 1410° Rankine ($\rho^T$), is:

$$\rho''(225 \times 144)/(55.18 \times 1410 = 0.41643 \text{ lbs./ft.}^3$$

The change in density in the reservoir between the cold and hot conditions is 0.40646 lbs./ft.$^3$(0.8229 lbs./ft.$^3$ minus 0.41643 lbs./ft.).

The reservoir volume needed to supply 1.0446 lbs. of nitrogen is therefore 2.569 Ft.$^3$ (1.0446 lbs. of nitrogen divided by 0.40646 lbs./ft.$^3$). A reservoir having volume of 2.569 ft.$^3$ can be obtained with a piece of 6inch, Sch. 40 pipe, 13 feet long or a piece of 8 inch Sch. 40 pipe 7 ½ feet long.

The above example assumes that the actuating bellows is installed in its free length and therefore the spring constant of the bellows may be neglected when calculating the required pressure thrust of the nitrogen.

It is also feasible under certain conditions to have the actuating chamber in contact with the hot object being supported. In such cases, the temperature of all of the gas in the entire system would be affected by temperature changes in the object being supported. In such cases, the expansion of the gas would follow closely a polytropic process, i.e., $p_1V_1n = P_2V_2n$ as opposed to the "open" system previously described.

Another system which would undergo a polytropic expansion is one wherein the compressible fluid is sealed into the reservoir 17 but pressure transmitting means are provided in lieu of the open gas line conduit 20 to operate the actuating chamber 15. One example of such a system would comprise a combined hydraulic-thermopneumatic system. The actuating chamber 15 and conduit 20 are filled with a noncompressible liquid, such as water or any of the conventionally available hydraulic fluids. The fluid is preferably inert to the gas in the reservoir. The term "inert," as used herein, includes insolubility of the gas in the liquid, as well as chemical inertness. Furthermore, the liquid should have a sufficiently low vapor pressure that it does not evaporate substantially at the interface between the gas and the liquid. The liquid, however, can be limited to the conduit 20, or even to the actuating chamber, at a sufficient distance from the reservoir that the gas in contact with the liquid is at or near ambient temperature. The relatively small amount of gas in the conduit 20, between the reservoir 17 and the liquid does not substantially change the polytropic nature of the expansion in the reservoir 17. A conventional loop seal, constituted by a simple downward bend in the conduit 20, would serve to maintain the gas sealed in the reservoir 17, and any portion of the conduit 20 on the reservior side of the seal.

Figures 5, 6:
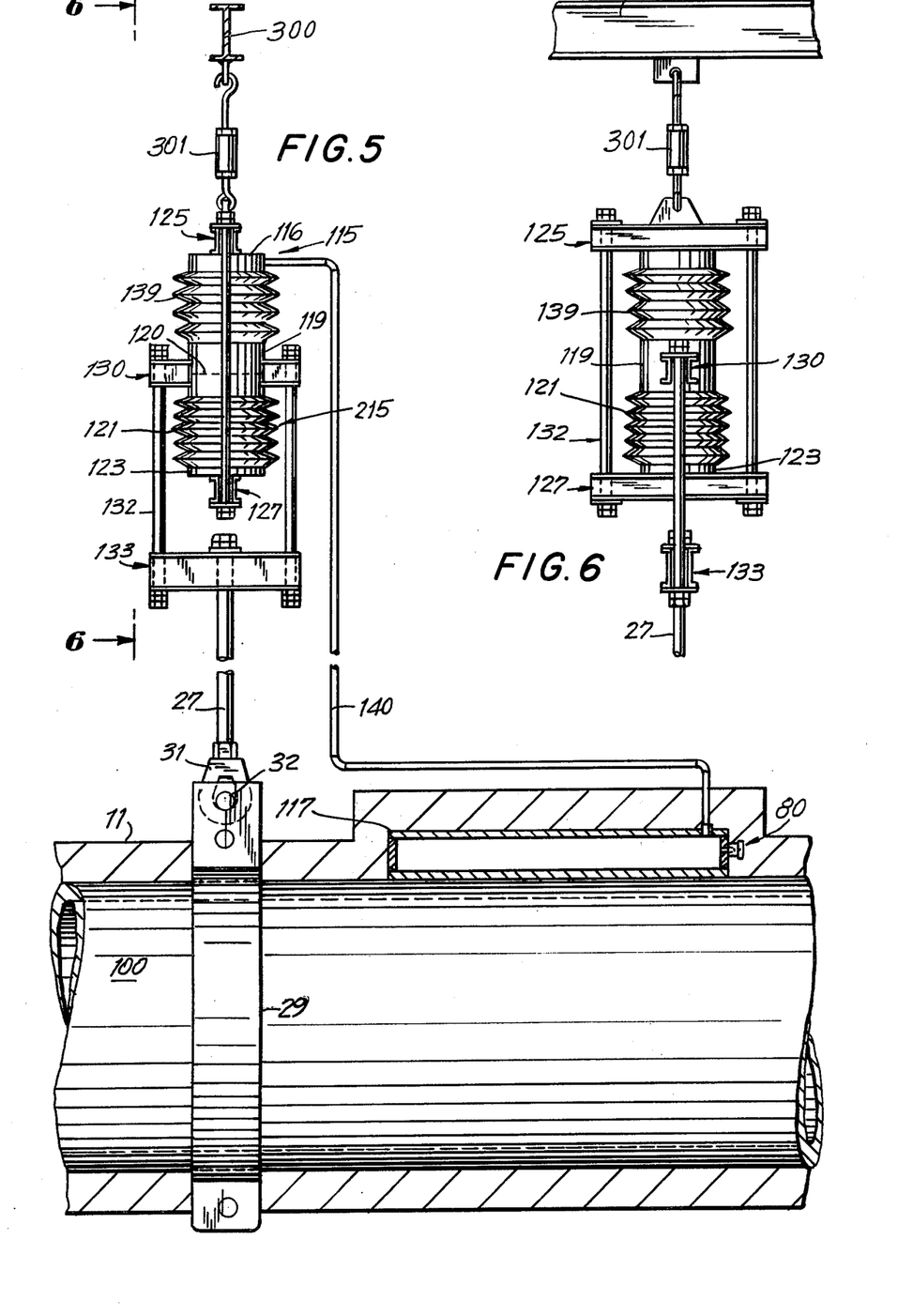

The system illustrated by FIGS. 2 and 4 above is useful when the pipe or other object being supported travels in a vertically upward direction when the temperature is increased. In this manner, when temperature decreases, i.e. for example during shut down, and the position change is down toward the cold position, gravity acts to move the object being supported downwardly as the pressure within, and thus the thrust by, the actuating chamber 15 decreases. There are circumstances however where the pipe travel caused by thermal expansion is in a vertically downward direction as temperature increases. For such situations, gravity cannot be utilized to return the object to its original cold position when temperature decreases. For this purpose, it is necessary to provide an energy storage means which stores up potential energy as the object moves in the downwardly direction during heating. Such potential energy storing means can include, for example, springs, of both the coil or disc type or combinations thereof. Preferably, however, a pressurized compartment is utilized to store the potential energy using, for example, an apparatus in accordance with FIG. 5 herein. FIG. 5 depicts a pair of variable-volume actuation chambers, in opposition, sharing a common movable end cap. Movement by the end cap to expand the first actuating chamber causes contraction of the second actuating chamber.

Referring to FIGS. 5 and 6, a device which stores potential energy comprises an upper actuating chamber, generally designated by the numeral 115, and lower actuating chamber, generally designated by the numeral 215, the two actuating chambers acting in opposition. The upper chamber 115 is defined by a first corrugated metal bellows 139, an upper end cap 116 and a central collar 119 having an intermediate sealing wall 120. The lower chamber 215 is defined by a second corrugated metal bellows 121, a lower end cap 123 and the central collar 119 and intermediate wall 120.

The upper end cap 116 is rigidly connected to a short beam 125. The lower end cap 123 is also connected to a short beam 127, which is parallel to beam 125. The two short beams are rigidly connected at their ends through a pair of vertical rods 128 to form a first "trapeze" support member. The upper short channel beam 125 is in turn secured to a stationary support 300 by coupled rod 301. The intermediate collar 119 is rigidly, intermediately secured to an intermediate short length of beam 130 extending perpendicularly to the direction of the first pair of beams 125 and 127. A pair of rigid rods 132 are connected to and extend downwardly from each end of the intermediate beam 130 and are in turn connected at their lower ends to the respective ends of a lowest short beam 133. A support rod 27 extends downwardly from the lowest beam 133 and is in turn connected to a pipe clamp supporting a pipe 100 which tends to move in a downwardly direction upon being heated.

The interior of the upper chamber 115, is connected to the pressure conducting conduit 140 which in turn is connected to the gas reservoir 117 which is in heat conducting contact with the pipe 100 to be supported in the same manner as reservoir 17 in FIG. 2, above. The lower actuating chamber 215 is sealed off from the atmosphere and from the upper actuating chamber 115.

In operation the device of FIG. 5 is connected into a system such that the upper beam 125 is suspended from a stationary support and the support rod 27 is connected to a pipe which it supports initially in the cold condition. The lower actuating chamber 215 and the first fluid actuating means comprising the upper actuating chamber, the conduit 140 and the reservoir 117 in heat contact with the pipe 100 are simultaneously pressurized with nitrogen to the desired pressure differentials. The pressure difference between the upper actuating chamber 115 and the lower actuating chamber 215 is that sufficient to provide the pressure thrust necessary to support the weight of the pipe 100 being supported. The pressure in the upper chamber is determined according to the pressure, volume and temperature requirement such that as the temperature of the pipe 100 increases, and the pipe moves in a downward direction, the pressure increases generated in the upper chamber 115 as a result of the temperature change in the reservoir 117 is sufficient to overcome the pressure thrust in the lower chamber 215 and force intermediate plate 120, collar 119 and beam 130, and thus the pipe 100, to move downwardly to the position the pipe 100 would normally reach if it were freestanding and subject to the same temperature conditions.

Upon cooling of the pipe 100 the operation is as follows:

The pressure within the reservoir 117 and thus within the upper actuating chamber 115 decreases, permitting the pressure thrust within the lower actuating chamber 215, acting against the intermediate plate 120 to force the plate 120 upwardly, thus moving the intermediate beam 130 upwardly and in turn causing upward movement of the pipe through the trapeze support 132, 133 connected to the support rod 27. The pressure built up within the lower actuating chamber 215 as the pipe moved downwardly thus served as an energy storage to move the pipe upwardly as the temperature decreases.

The above embodiments both utilize an expansion member having sealed end caps to provide the volume expanding capability required for the device of the present invention. Other volume expanding devices could be utilized; however, the bellows-type system is believed to be most preferable because it provides a completely sealed system, which can be welded closed, and yet which only to a slight extent affects the net pressure force exerted to vary the volume of the chamber. Other systems which could be utilized include pistons moving reciprocatingly in a cylinder, or a so-called rotary piston and chamber or diaphragms moving in response to the varying pressures. In all cases there is a moving seal between the piston surface and the interior cylinder surface which is much more difficult to render fluid pressure-tight; even under the best of circumstances such a moving seal has at least a minimal leakage, which, over the extended periods of time that the present device is intended to operate, could result in a substantial loss of pressure from the system. A sealed flexible diaphragm could be used.

Referring to the drawings, the support coupling, via clamp 29, is located adjacent the gas reservoir 117. Thus, the temperature of the pipe, in effect, is taken substantially at the same location as the support means for the pipe. This, however, is not necessary and, for example, the reservoir 117 can be located at any other point along the pipe system, for example as shown in FIG. 1. Indeed, it may even be more effective to locate the gas reservoir somewhere along the vertical rise of pipe, e.g., at location C, so as to measure the temperature directly at the point where the vertical rise, caused by thermomechanical expansion, is actually occurring. This would, of course, only be necessary where a substantial temperature difference exists between different parts of the system being supported.

The actuating means system of the present invention can, advantageously, be sealed so as to be completely gas-tight. This can be accomplished, for example, by welding shut the nipple 81 connected to the upper collar 40 immediately following the initial pressurization of the system. Thus, absent a structural failure in any of the portions forming the pneumatic system, and especially absent the failure of the corrugated tubular, or bellows, unit 39, there can be no loss of fluid mass from within the system, thus maintaining constant the mass of compressible fluid therewithin. The location of the pressurization coupling is not crucial and can be, as shown, through nipple 81 or through the end of the reservoir 17, or on the connecting pipe 20.

The above described embodiments are but some of the possible embodiments of devices which fall within the ambit of the present invention. The various elements forming the above embodiment are all generally conventional to the art and are made of conventional materials. All equivalent elements, and materials of construction can be utilized within the broad scope of the present invention, including those elements or materials of construction which are now known or the equivalents or substitutes for which may be developed in the future. The full scope of this invention is defined by the following claims.

What is claimed is:

1. A thermopneumatic support device for providing support over a range of positions for objects subject to temperature changes and thus to changes in position resulting from thermal expansion or contraction, the device comprising:

1. a closed, expandable fluid pressure system defining an internal volume substantially sealed off from external fluid connection so as to maintain a constant mass of fluid within the internal volume, the system comprising:
   a. system volume expanding means comprising a movable surface and
   b. thermal conducting means adapted to be in thermally conducting contact with the object to be supported and thus providing a path for thermal energy between the object to be supported and a fluid within the internal volume whereby a temperature increase in an object to be supported results in a temperature increase of the fluid and a resultant increase in pressure of the fluid;
2. coupling means operably connected to the pressure system and adapted to be structurally connected to a stationary support so as to support the support device; and
3. linking means operably connected to the system volume expanding means and adapted to be structurally connected to and to support the object to be supported, such that movement of the movable surface in response to a change in pressure in the fluid results in relative movement between the linking means and the coupling means, the energy for moving the support in response to temperature changes in an object to be supported being obtained directly from the thermal energy in that object.

2. A thermopneumatic support device for providing support over a range of positions for objects subject to temperature changes and thus to changes in position resulting from thermal expansion or contraction, the device comprising:
   1. an expandable chamber having a movable surface;
   2. structural linking means secured at one portion to the movable surface and designed and adapted to be secured at a second portion to the object being supported so as to support the object;
   3. coupling means operably connected to the expandable chamber and adapted to be connected to a stationary support;
   4. a fluid pressure reservoir containing a mass of fluid and adapted to be in thermal conducting contact with the object being supported whereby a temperature increase in an object to be supported results in a temperature increase of the fluid and a resultant increase in pressure of the fluid; and
   5. pressure linking means between the fluid pressure reservoir and the expandable chamber, the reservoir, chamber and pressure linking means forming a sealed, substantially fluid-tight system, whereby a change in the temperature of the object being supported causes a change in the pressure within the reservoir, and thus within the expandable chamber, causing movement of the movable surface of the expandable chamber in response thereto and thus relative movement between the coupling means and the structural linking means, the energy for generating the movement is obtained directly from the thermal energy in the object to be supported.

3. The support device of claim 2 wherein the expandable chamber comprises in addition a stationary rigid surface portion operably connected to the coupling means and wherein the movable surface comprises a second rigid surface portion movable in a direction transverse to the stationary rigid surface portion and which is secured to the structural linking means and a flexible elongatable portion intermediate and secured to the stationary rigid surface portion and the movable rigid surface portion.

4. The support device of claim 3 wherein the flexible elongatable surface portion comprises a flexible, pleated, metallic tubular member.

5. The support device of claim 4 comprising in addition guide means, including a first guide portion, rigidly secured to the stationary rigid surface portion and a second guide portion rigidly secured to the movable rigid surface portion and movable relative to the first guide portion.

6. The support device of claim 5 comprising in addition first stop means secured to the guide means for determining the minimum separation between the stationary and movable rigid surface portions and second stop means for determining the maximum separation between the movable and stationary rigid surface portions, whereby the range of travel of the movable rigid surface portion is limited.

7. The support device of claim 1 comprising in addition sealable pressurizing means for injecting a compressible fluid under pressure into the closed, expandable fluid pressure system.

8. The support device of claim 2 comprising in addition a second expandable chamber having a movable surface, the movable surface of the second expandable chamber being rigidly secured to the movable surface of the first expandable chamber and the second expandable chamber operating in opposition to the first expandable chamber, whereby the volume of the second expandable chamber varies inversely with the volume of the first expandable chamber, the second expandable chamber being substantially completely sealed off from the first expandable chamber and from the atmosphere.

9. The support device of claim 8 comprising in addition guide means within each of the two expandable chambers.

10. The support device of claim 2 comprising in addition potential energy storing means operably connected to the movable surface such that upon reduction of pressure within the expandable chamber potential energy stored within the potential energy storage means is released, causing movement of the movable surface to reduce the volume of the expandable chamber.

11. The support device of claim 2, wherein the expandable chamber contains a non-compressible liquid in pressure-transmitting contact with the pressure linking means.

12. The support device of claim 11, wherein the non-compressible liquid substantially completely fills the expandable chamber and at least a portion of the pressure-linking means.

13. The support device of claim 2, wherein the fluid-tight system is substantially completely filled with a gas.

14. A thermopneumatic support device for providing support over a range of positions for objects subject to temperature changes and thus to thermomechanical changes in position, the support device comprising variable volume thermopneumatic actuating system means having first and second portions relatively movable with respect to each other and thermal conducting means adapted to be in thermally conductive contact with the object to be supported and thus providing a path for thermal energy between an object to be supported and the actuating system, the actuating system means varying in volume in direct response to variations in temperature of the object being supported the energy for the relative movement of the first and second portions being obtained directly from the thermal energy in an object to be supported; the first portion being adapted to be in structurally supporting connection to the object being supported and the second portion being adapted to be in structurally supported connection to a stationary support.

15. A thermopneumatically supported equipment system, one portion of the system being rigidly secured to a stationary member, the equipment system being susceptible to temperature changes and thus to changes in position of portions thereof relative to the portion secured to the stationary member resulting from thermal expansion or contraction, a thermopneumatic support device for supporting a portion of the system distant from the stationary support member and subject to changes in position relative to the stationary support member caused by thermal expansion and contraction, the thermopneumatic support device comprising variable volume thermopneumatic actuating system means having first and second portions relatively movable with respect to each other, thermal conducting means operatively connected to the actuating system means and in thermally conductive contact with the equipment system such that thermal energy is conducted between the equipment system and the actuating system means when there is a change in temperature in the equipment system; the actuating system varying in volume in direct response to variations in temperature of the equipment system being supported, the energy for the volume changes being provided directly by the thermal energy being conducted by the thermal conducting means; coupling means operably connected to the first portion and in structurally supporting connection to the equipment system; and linking means operably connected to the second portion and in structurally supported connection to a stationary support; whereby the equipment system is supported over a range of positions changing in accordance with the thermal changes in the equipment, the energy for the change in positions being provided directly by the thermal energy conducted between the equipment and the actuating system.

* * * * *